July 12, 1949.

H. W. HAPMAN 2,476,040

FLIGHT CONVEYER

Original Filed May 5, 1943

Inventor
Henry W. Hapman
Barthel & Bugbee
Attorneys

By

Patented July 12, 1949

2,476,040

UNITED STATES PATENT OFFICE 2,476,040

FLIGHT CONVEYER

Henry W. Hapman, Detroit, Mich., assignor, by mesne assignments, of sixty per cent to Henry W. Hapman and forty per cent to Hannah J. Hapman, both of Detroit, Mich.

Original application May 5, 1943, Serial No. 485,707, now Patent No. 2,429,549, dated October 21, 1947. Divided and this application March 7, 1947, Serial No. 732,991

9 Claims. (Cl. 198—168)

This invention relates to conveyors and, in particular, to flight conveyors.

One object of this invention is to provide a flight conveyor having a flight composed of metal or other suitable material having a peripheral recess containing an annular contact member of elastic deformable material, such as rubber or synthetic rubber, so that a large diameter conveyor flight can be constructed which uses only a comparatively small amount of rubber or synthetic rubber.

Another object is to provide a flight conveyor having a flight composed of separable portions between which is held an annular contact member of rubber or synthetic rubber so that the parts of the flight may be separated to replace worn or otherwise damaged contact members.

Another object is to provide a flight conveyor, as set forth in the preceding objects, wherein the flights are interconnected by a flexible connecting member in the form of a chain having links attached to the flights and pivoted to one another between flights.

Another object is to provide a flight conveyor as set forth in the preceding objects wherein the flights are composed of oppositely cupped disc-like members having offset peripheral flanges which in assembly form an annular peripheral recess adapted to receive the rubber-like annular contact member, or an annular metal wear member.

Another object is to provide a flight conveyor as set forth in the preceding objects which is capable of propulsion by mechanism engaging the peripheries of the flights, thereby eliminating the necessity for sprockets engaging a sprocket chain, with consequent wear and frequency of replacement or repair.

This is a division of my co-pending application Serial No. 485,707 filed May 5, 1943 for Flight conveyors, which has matured into U. S. Patent No. 2,429,549 of October 21, 1947.

Figure 1:
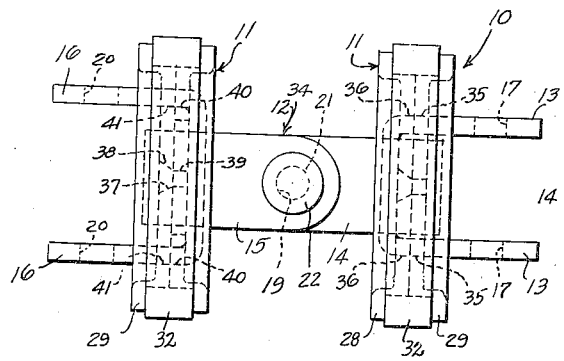
Figure 1 is a side elevation of a portion of a flight conveyor according to a preferred form of the invention, showing my improved flight conveyor.
Figure 2:
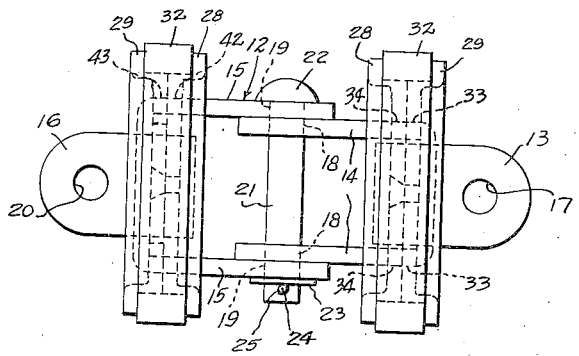
Figure 2 is a top plan view of the portion of the flight conveyor shown in Figure 1.

Referring to the drawings in detail, Figures 1 and 2 show a portion of a flight conveyor 10 consisting generally of flights 11 mounted on a chain-like flexible connecting member 12. The flexible connecting member 12 is composed of narrow U-shaped crossed links 13 and 14 and wide U-shaped crossed links 15 and 16 alternating from flight to flight along the conveyor. The links 13 and 14 are narrower than the links 15 and 16 in order that the former may fit inside the latter in overlapping relationship. For this purpose, and to receive pintle pins, the narrow links 13 and 14 are provided respectively with aligned pairs of transverse holes 17 and 18, whereas the wide links 15 and 16 are similarly provided with aligned pairs of holes 19 and 20 respectively. The narrow links 13 or 14 are placed inside the wide links 15 or 16 (Figure 2) with their holes in alignment and a pintle pin 21 with a head 22 is passed through the aligned holes 18 and 19 or 17 and 20. A washer 23 held in place by a cotter pin 24 passing through a hole 25 in the pintle pin 21 locks the assembly in position.

The flights 11 are provided with disc-like clamping plates 26 and 27 having offset edge flanges 28 and 29 respectively forming annular flanges 30 and 31. The recesses 30 and 31 in assembly form an annular peripheral groove adapted to receive an annular wear member or sealing member 32 of elastic deformable material, such as natural or synthetic rubber, or mixtures thereof.

Figure 3:
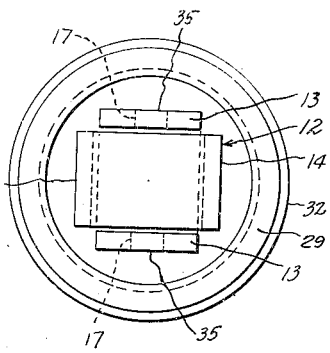
Figure 3 is a right-hand end elevation of the flight conveyor portion shown in Figures 1 and 2.
Figure 4:
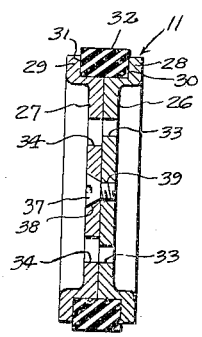
Figure 4 is a central cross section through the conveyor flight shown at the right hand side of Figure 2, with the conveyor chain omitted.

To provide for the mounting of the flights 11 upon the chain-like flexible connecting members 12, the clamping plates 26 and 27 are provided with aligned pairs of spaced parallel slots 33 and 34 (Figures 2 and 4) of a width sufficient to receive the arms of the U-shaped links 13, 14, 15 or 16. The clamping plates 26 and 27 are also provided with a second set of pairs of spaced parallel slots 35 and 36 (Figures 1 and 3) perpendicular to the slots 33 and 34 and receiving the arms of the links 13. Thus, the connecting portion of each U-shaped link 13 is perpendicular to the connecting portion of each link 14 and crosses it on the opposite side of the flight 11. The two clamping plates 26 and 27 are held together by a screw 37 (Figure 4) passing through a hole 38 in the clamping plate 27 and threaded into a hole 39 in the clamping plate 26.

The wider links 15 and 16 pass through similar sets of mutually perpendicular slots 40, 41 (Figure 1) and 42, 43 (Figure 2) except that the slots are necessarily farther apart due to the increased width of the links. As previously stated, the links 15 and 16 are wider than the links 13 and 14 in order that the latter may be received within the overlaping arms of the former, as shown in Figures 1 and 2. The clamping plates 11 receiving the crossed links 15 and 16 are similarly held together by a screw 37 passing through a hole 38 into a threaded hole 39.

In the operation of the flight conveyor of the invention, the conveyor 10 is made up in the form of an endless chain supported and guided by grooved pulleys or the like and passing through tubular conduits. One of the pulleys is driven by a motor or other suitable source of power through appropriate reduction gearing. The details of the driving and guiding arrangements form no part of the present invention but are fully disclosed in my co-pending application, Serial No. 485,707 filed May 5, 1943 for Flight conveyors, of which the present application is a division.

As the flight conveyor 10 moves through its conduit and passes a suitable feeding aperture or hopper, it receives a charge of the material to be conveyed. The material falls between the flights 11 and is carried along by them, the annular sealing members 32 engaging the walls of the conduit and preventing leakage or slippage of the material.

From Figures 1 and 2 it will be observed that the alternate pintle pins 21 in the flight conveyor 10 are perpendicular to one another, thereby pivoting the alternate sets of U-shaped links to swing on mutually perpendicular pivot axes. By reason of this construction, the flight conveyor 10 can move laterally in either of two directions, thereby enabling it to negotiate bends in the conveyor conduit or turns on the conveyor pulleys, regardless of their positions or relative arrangement. This construction therefore imparts great flexibility to the conveyor and enables it to be adapted to any peculiarities of the particular installation such as negotiating obstacles in a building, tank or the like, in which the conveyor is to be installed.

For installations where an annular rubber or synthetic rubber insert 32 is unsuitable, such as in conveyors for handling high temperature fly ash in heating or power plants, an annular metal insert 32 may be used in its place.

What I claim is:

1. A flight conveyor comprising an endless flexible conveying member, a series of conveyor flights connected to said member at intervals therealong, each of said conveyor flights including a pair of clamping members having plate-like portions secured to one another in abutting relationship and having peripheral portions offset axially in opposite directions relatively to one another to form a continuous peripheral recess, and a wear member disposed in said recess.

2. A flight conveyor comprising an endless flexible conveying member, a series of conveyor flights connected to said member at intervals therealong, each of said conveyor flights including a pair of clamping members having plate-like portions secured to one another in abutting relationship and having peripheral flanged portions offset axially in opposite directions relatively to one another to form a continuous peripheral recess, and a wear member of elastic deformable material disposed in said recess.

3. A flight conveyor comprising an endless flexible conveying member, a series of conveyor flights connected to said member at intervals therealong, each of said conveyor flights including a pair of clamping members of cup-shaped form having plate-like portions secured to one another in abutting relationship and having annular peripheral portions offset axially in opposite directions relatively to one another to form an annular peripheral recess, and an annular wear member disposed in said recess.

4. A flight conveyor comprising an endless flexible conveying member, a series of conveyor flights connected to said member at intervals therealong, each of said conveyor flights including a pair of clamping members having plate-like portions secured to one another in abutting relationship at their central portions and having annular peripheral portions offset axially in opposite directions relatively to one another to form an annular peripheral recess, and an annular wear member of elastic deformable material disposed in said recess.

5. A flight conveyor comprising a series of conveyor flights, each flight including disc-like clamping members secured to one another and having oppositely offset peripheral portions forming an annular peripheral recess therebetween, said clamping members having spaced pairs of apertures therethrough, U-shaped links projecting through said apertures from opposite sides of said flights, pivot elements interconnecting the free ends of said links, and an annular wear member disposed in said peripheral recess.

6. A flight conveyor comprising a series of conveyor flights, each flight including disc-like clamping members secured to one another and having oppositely offset peripheral portions forming an annular peripheral recess therebetween, said clamping members having spaced pairs of apertures therethrough with one pair of apertures in each flight disposed perpendicular to the other pair, U-shaped links projecting through said apertures from opposite sides of said flights, pivot elements interconnecting the free ends of said links and an annular wear member disposed in said peripheral recess.

7. A flight conveyor comprising a series of conveyor flights, each flight including disc-like clamping members secured to one another and having oppositely offset peripheral portions forming an annular peripheral recess therebetween, said clamping members having spaced pairs of apertures therethrough with one pair of apertures in each flight disposed perpendicular to the other pair, U-shaped links projecting through said apertures from opposite sides of said flights with the central portions of said links crossing one another on opposite sides of said flights, pivot elements interconnecting the free ends of said links, and an annular wear member disposed in said peripheral recess.

8. A flight conveyor comprising a series of conveyor flights, each flight including disc-like clamping members secured to one another and having oppositely offset peripheral portions forming an annular peripheral recess therebetween, said clamping members having spaced pairs of apertures therethrough, U-shaped links projecting through said apertures from opposite sides of said flights, pivot elements interconnecting the free ends of said links, certain of said links being wider than and overlapping other links at their free ends, and an annular wear member disposed in said peripheral recess.

9. A flight conveyor comprising a series of conveyor flights, each flight including disc-like clamping members secured to one another and having oppositely offset peripheral portions forming an annular peripheral recess therebetween, said clamping members having spaced pairs of apertures therethrough, U-shaped links projecting through said apertures from opposite sides of said flights, pivot elements interconnecting the free ends of said links, alternate pivot elements being arranged perpendicular to one another, and an annular wear member disposed in said peripheral recess.

HENRY W. HAPMAN.

REFERENCES CITED

The following references are of record in the file of this patent:

UNITED STATES PATENTS

| Number | Name | Date |
|---|---|---|
| 499,525 | Dodge | June 13, 1893 |
| 1,069,308 | Wilson | Aug. 5, 1913 |
| 1,637,869 | Manzel | Aug. 2, 1927 |